United States Patent
Araki et al.

(10) Patent No.: US 8,270,124 B2
(45) Date of Patent: Sep. 18, 2012

(54) MAGNETIC HEAD HAVING REDUCED COST ELECTROSTATIC DISCHARGE SHUNT

(75) Inventors: Satoru Araki, San Jose, CA (US); David John Seagle, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 972 days.

(21) Appl. No.: 12/237,220

(22) Filed: Sep. 24, 2008

(65) Prior Publication Data

US 2010/0073826 A1  Mar. 25, 2010

(51) Int. Cl.
  *G11B 5/33* (2006.01)
(52) U.S. Cl. .......................................... 360/323
(58) Field of Classification Search .................. None
  See application file for complete search history.

(56) References Cited

U.S. PATENT DOCUMENTS

| | | | |
|---|---|---|---|
| 6,538,857 B1 * | 3/2003 | Doss et al. ............... | 360/323 |
| 6,650,519 B1 | 11/2003 | Karr et al. ............... | 361/58 |
| 6,716,537 B1 | 4/2004 | Kakihara ............... | 428/611 |
| 6,728,082 B2 | 4/2004 | Tabat et al. ............ | 360/323 |
| 6,795,278 B2 | 9/2004 | Jarrett et al. ........... | 360/323 |
| 6,914,758 B2 | 7/2005 | Ryan et al. ............. | 360/323 |
| 6,972,930 B1 | 12/2005 | Tang et al. ............. | 360/234.5 |
| 7,009,819 B2 | 3/2006 | Soda et al. ............. | 360/323 |
| 7,119,995 B2 | 10/2006 | Granstrom et al. ...... | 360/323 |
| 7,126,796 B2 | 10/2006 | Lin ........................ | 360/322 |
| 7,151,654 B1 | 12/2006 | Mao et al. .............. | 360/324.2 |
| 7,245,463 B2 * | 7/2007 | Gill ........................ | 360/324.12 |
| 2002/0126424 A1 * | 9/2002 | Tabat et al. ............ | 360/323 |
| 2005/0052792 A1 * | 3/2005 | Gill ........................ | 360/324.12 |
| 2007/0091512 A1 | 4/2007 | Nichols et al. .......... | 360/324.2 |
| 2007/0097557 A1 | 5/2007 | Seagle .................... | 360/323 |

* cited by examiner

Primary Examiner — Holly Rickman
Assistant Examiner — Linda Chau
(74) Attorney, Agent, or Firm — Zilka-Kotab, PC

(57) ABSTRACT

A method for manufacturing a magnetic head with an electrostatic discharge resistor for preventing electrostatic discharge damage to magnetic head. The electrostatic discharge resistor is formed by a processes that saves manufacturing time and cost by forming resistor in the same deposition and patterning steps used to form the magnetoresistive sensor. However, the resistor includes only a portion of the layers used to form the magnetoresistive sensor, thereby ensuring that the resistor will have sufficient resistivity.

8 Claims, 10 Drawing Sheets

MAGNETIC HEAD HAVING REDUCED COST ELECTROSTATIC DISCHARGE SHUNT

FIELD OF THE INVENTION

The present invention relates to magnetic heads for data recording, and more particularly cost effective method for manufacturing a magnetic head with electrostatic discharge shunts.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic hits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a method for manufacturing a magnetic head that includes depositing a magnetoresistive sensor material on a wafer. A first mask structure is formed over the magnetoresistive sensor material, the first mask structure having a sensor defining portion for defining an edge of a magnetoresistive sensor, and also having a portion configured to define a resistor. A first material removal process is performed to remove portions of the magnetoresistive sensor material that are not protected by the first mask structure. The first mask structure is then removed and a second mask structure is formed, the second mask structure being configured to cover a sensor area while leaving a resistor area uncovered. A second material removal process is then, performed to remove a portion of the magnetoresistive sensor material that is not protected by the second mask structure. The second material removal process is terminated before all of the magnetoresistive sensor material has been removed.

The magnetoresistive sensor can include a seed layer structure such as a layer of Ta and a layer of Ru, and can also include a layer of antiferromagnetic material, a pinned layer structure, a non-magnetic spacer or barrier layer and a magnetic free layer. The second material removal process can be performed sufficiently to remove the free layer, non-magnetic layer and pinned layer structure from the resistor area, and may leave all or a portion of the layer of antiferromagnetic material in the resistor area.

In this way, the electrostatic discharge resistor can be formed of the same material as the sensor and can be formed in the same patterning steps, while advantageously allowing the resistor to have a high enough resistance to ensure optimal read and write head performance.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
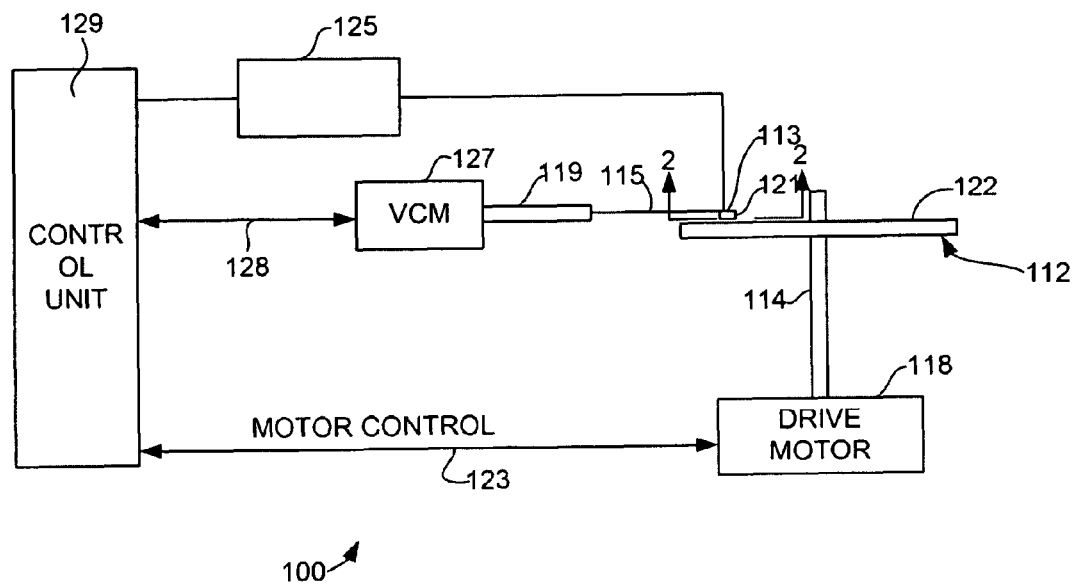
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on die slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control Signals on hue 128. The control signals on line 128 provide the desired current profiles to optimally move and position slider 113 to the desired data track on disk 112. Write and read signals are communicated to and from write and read heads 121 by way of recording channel 125.

Figure 2:
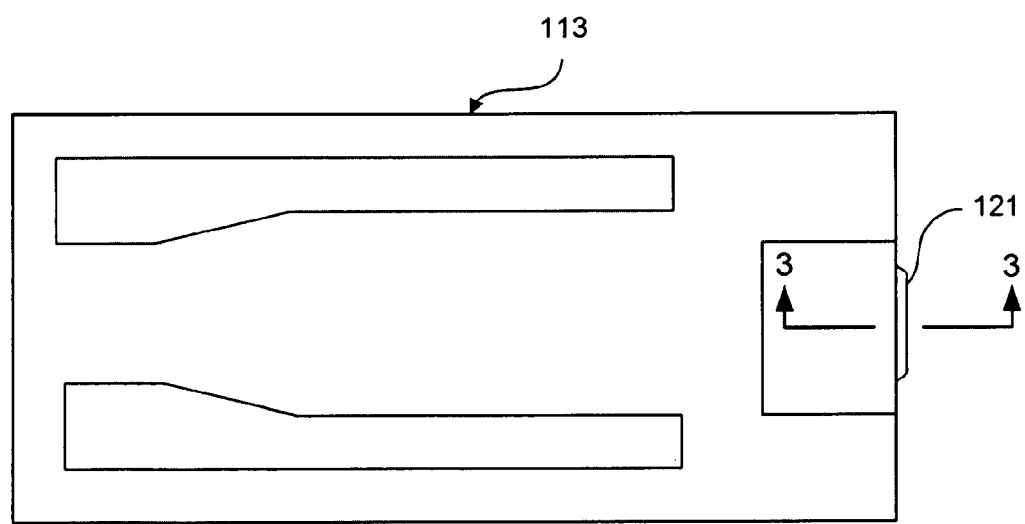
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an Inductive write head and a read sensor. Is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
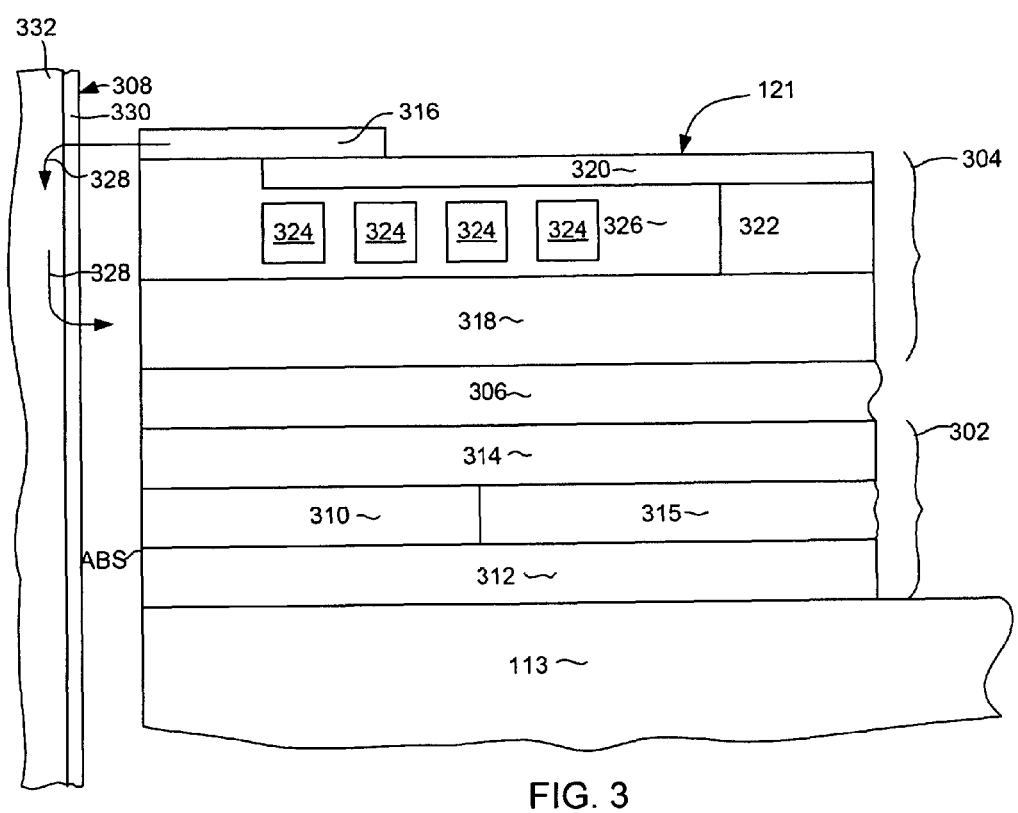
FIG. 3 is a cross sectional view of a magnetic head, taken from line 3-3 of FIG. 2 and rotated 90 degrees counterclockwise, of a magnetic read/write head according to an embodiment of the present invention.

With reference now to FIG. 3, the magnetic head 121 includes a read head 302 and a write head 304, formed on the slider body 113. The read head 302, and write head 304 may be separated from one another by a non-magnetic, electrically insulating spacer layer 306, which can be, for example alumina. The magnetic head 121 has an air bearing surface ABS that faces a magnetic medium 308, such as the disk 112 described above with reference to FIG. 1.

The read head 302 can include a magnetoresistive sensor 310, sandwiched between first and second magnetic shields 312, 314. A non-magnetic, electrically conductive fill layer 315 can be provided between the shields 312, 314 in the region beyond the magnetoresistive sensor 310.

The write head 304 can include a magnetic write pole 316 and a magnetic return pole 318. The write pole 316 can be magnetically connected with a magnetic shaping layer 320, which can be magnetically connected with the return pole 318 by a magnetic back gap layer 322. A write coil 324, which is shown in cross section in FIG. 3, passes between the shaping layer 320 and write pole 316 and the return pole 318. The write coil 324 can be encased in a dielectric material 326 such as alumina, and or hard baked photoresist. When a current flows through the write coil 324, a magnetic flux is induced in the return pole 318, back gap layer 322, shaping layer 320 and write pole 316. This results in a magnetic write field 328 being emitted from the write pole 316.

The magnetic media 308 can include a magnetically hard top layer 330 and magnetically soft underlayer 332. The strong, highly concentrated write field 328 locally magnetizes a portion of the top layer 330. The write field 328 then travels through the magnetically soft underlayer 328 then travels back to the return pole 318, where it is sufficiently spread out and weak that it does not magnetize the top layer 330 on the way back to the return pole 318.

Figure 4:
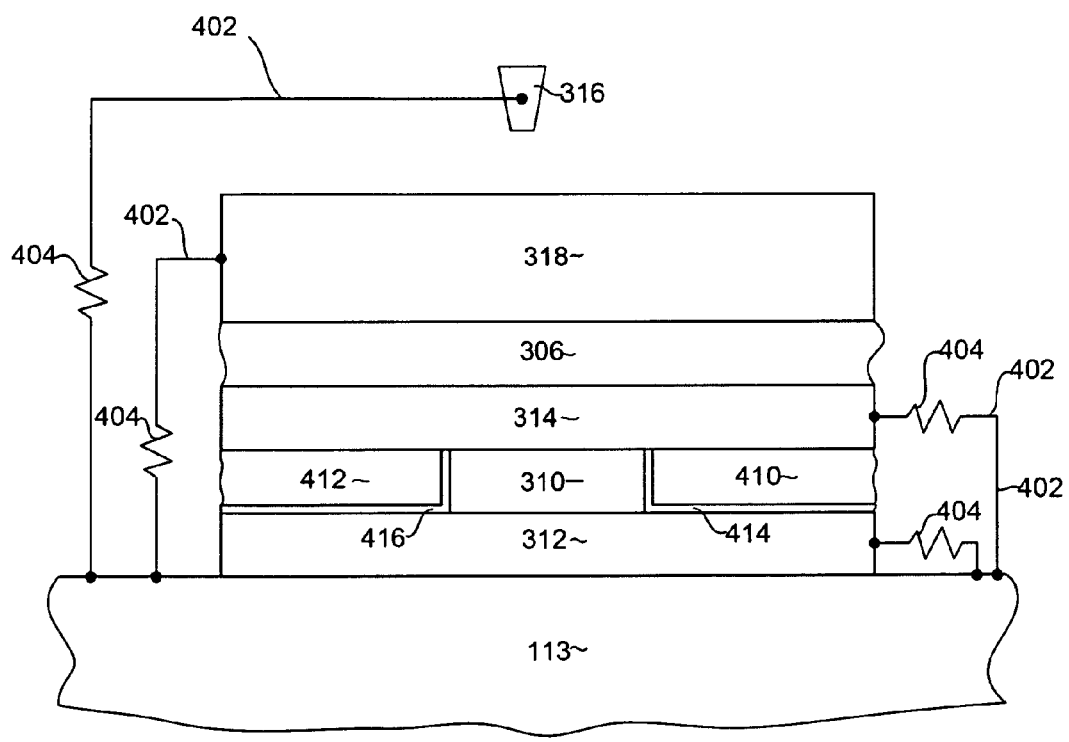
FIG. 4 is an ABS schematic view of the magnetic head.

With reference now to FIG. 4, a schematic illustration shows the read and write heads 302, 304 as viewed from the air bearing surface. In FIG. 4, the sensor 310 is sandwiched between the shields 312, 314, which in the ease of a current perpendicular to plane sensor such as a CPP GMR sensor or tunnel valve can be constructed of an electrically conductive material so that they function as leads for supplying a sense current to the sensor 310. Magnetically hard bias layers 410, 412 can be formed at either side of the sensor 310 to provide biasing for a free layer of the sensor 310 (not shown in FIG. 4). The hard bias layers 410, 412 can be separated from the sensor 310 by thin insulation layers 414, 416 such as alumina.

During operation or during manufacture, an electrostatic potential within either or both of the read and write heads 302, 304 can result in irreparable damage to the read and/or write heads 302 304. For example, an electrostatic potential between the shields 312, 314 of the read head 302 can cause an unacceptably high current to flow through the sensor element 310, which can burn out the sensor 310 rendering it inoperable.

In order to prevent such electric potentials from building up between the shields 312, 314 of the read element 302 or the poles 318, 316 of the write element, each of these elements 312, 314, 218, 316 can be grounded to a common potential, such as by grounding to the slider body 113, as represented, by ground lines 402. However, in order for such ground lines 402 to drain unwanted electrostatic potential without adversely affecting the performance of the read head 302 or write head 304, the ground lines 402 must include a resistor 404 having a high resistance. For example, having a high resistance in the ground line 402 connected with the read head shields 312, 314 prevents the shunting of sense current. Therefore, in order to ensure proper functioning of the read and write heads 302, 304 the resistors 404 preferably each have a resistance of at least 5 K Ohms, or more preferably about 30 K Ohms.

While it would be desirable to construct these resistors 404 in the same patterning and deposition steps used to manufacture another element of the read and write heads 302, 304, the materials used in the read and write heads 302, 304 are not resistive enough to effectively be used. For example, it would be desirable to form the resistor of the same materials used to construct the read sensor 310, however, in order to construct a resistor having a sufficiently high resistance, the resistor would have to be so long and thin that defects such as opens or shorting would likely occur. Further, such a resistor would occupy too much area on the slider. For this reason, ESD shunt resistors have been formed of special high resistance materials. These resistors have been formed in separate deposition and patterning steps, requiring significant additional cost and manufacturing time.

Figure 5:
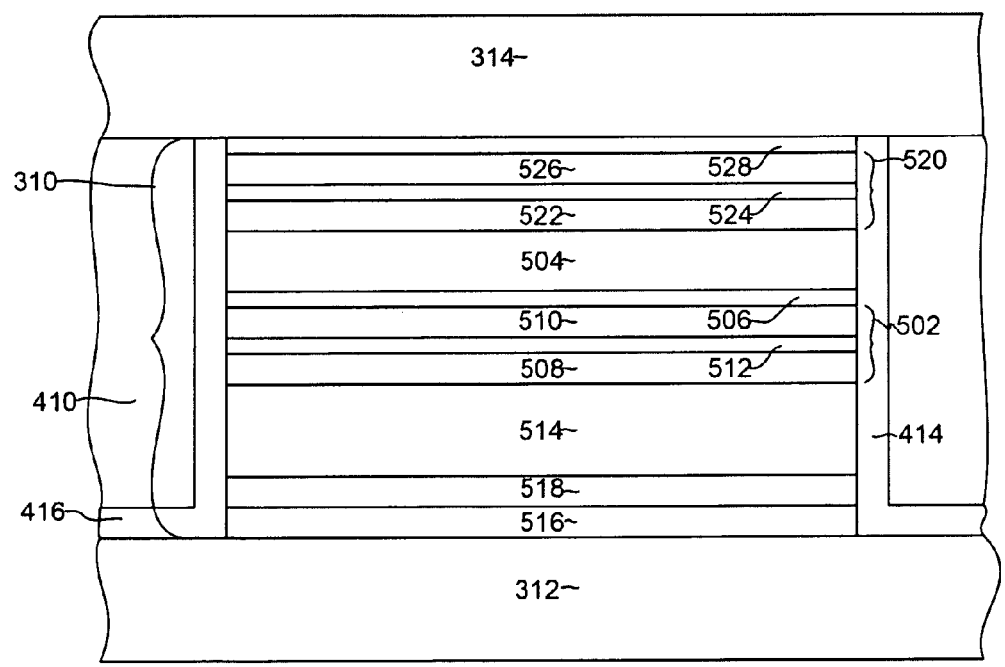
FIGS. 5-10 are views of a magnetic head in various intermediate stages of manufacture, illustrating a method for manufacturing a magnetic head according to an embodiment of the invention.

The present invention provides a process that allows materials of the sensor 310 to be used to construct an ESD resistor, while also allowing the resistor to have a sufficiently high resistance. With reference now to FIG. 5, the construction of a possible embodiment of a sensor 310 is described In greater detail. The sensor 310 includes a magnetic pinned layer structure 502, and a magnetic free layer structure 504. A non-magnetic layer 506 is sandwiched between the pinned layer structure 502 and the free layer 504. The sensor 310 can be a Giant Magnetoresistive (GMR) sensor, or could be a tunnel valve (TMR). If the sensor is a GMR sensor, the non-magnetic layer can be an electrically conductive, non-magnetic material, such as Cu. If the sensor 310 is a tunnel valve, the non-magnetic layer 506 will be a thin, electrically insulating barrier layer such as Mg-Ox.

The pinned layer structure 502 can be an antiparallel coupled structure including a first magnetic layer (AP1) 508, a second magnetic layer AP2, and a non-magnetic antiparallel coupling layer such as Ru 512 sandwiched between, the AP1 and AP2 layers. A layer of antiferromagnetic material (AFM layer) 514 is formed beneath and exchange coupled with the AP1 layer 508. The AFM layer 514 can be a material such as IrMn or PtMn.

The sensor 510 can also include one or more seed layers formed beneath the AFM layer to promote a desired grains structure in the above deposited layers. In the presently described embodiment, the sensor includes a first seed layer 516 formed of Ta, and a second seed layer 518 constructed of Ru formed above the first seed layer 516.

The sensor 510 can also include a capping layer structure 520, formed at the top of the sensor 510 to protect the sensor layers from damage during manufacture. In the presently described embodiment the capping layer can include; a first layer of Ru 522 formed over the free layer 504; a layer of Ta 524 formed over the first layer of Ru 522; and a second layer of Ru 526 formed over the layer of Ta 524. A layer of Si 528 can be formed over the second layer of Ru 526 to be used during manufacture as an adhesion layer for a carbon etch stop layer which can is removed by reactive ion etching and is, therefore, not shown in FIG. 5.

Figure 6:
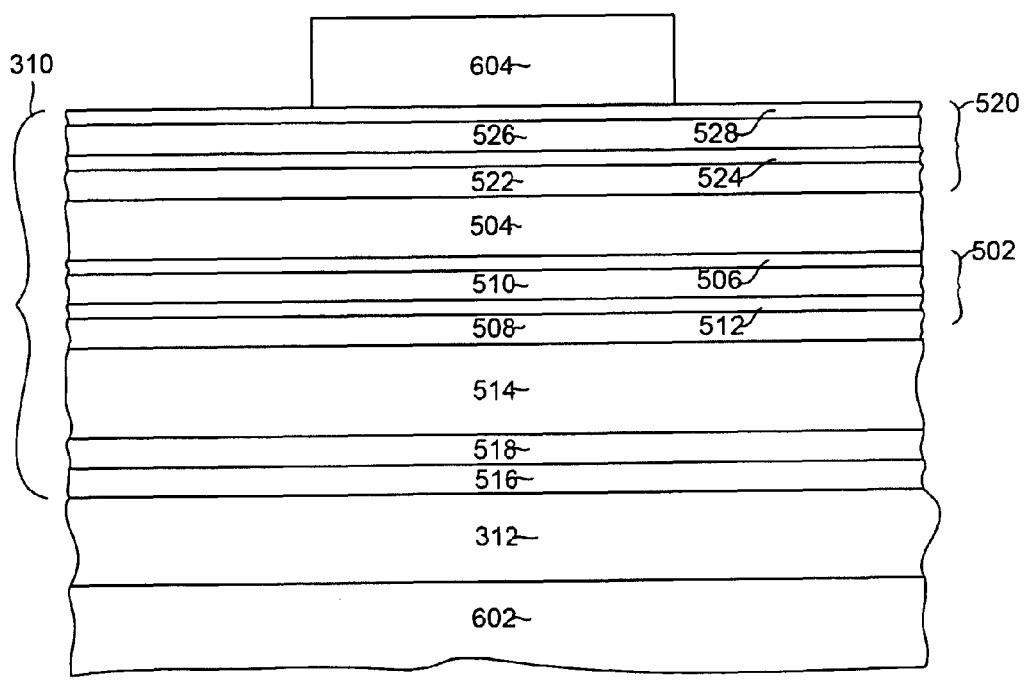

With reference now to FIGS. 6-10, a method is described for manufacturing a sensor and simultaneously forming an ESD shunt resistor. With particular reference to FIG. 6, a lower shield layer 312 is formed on a wafer 602. Then, the layers of the sensor 310 are deposited full film over the wafer 602 and shield 312. The sensor layers can include a Ta seed layer 516, a Ru seed layer 518, an AFM layer 514, a pinned layer structure 502 a free layer 504 and a capping layer structure 520. After depositing the sensor layers 310, a mask structure 604 is formed over the sensor layers 310. The mask structure 604 can include a photolithographically patterned resist layer, and may also include other layers such as one or more hard mask layers, an adhesion layer, an image transfer layer, or other layers.

Figure 7:
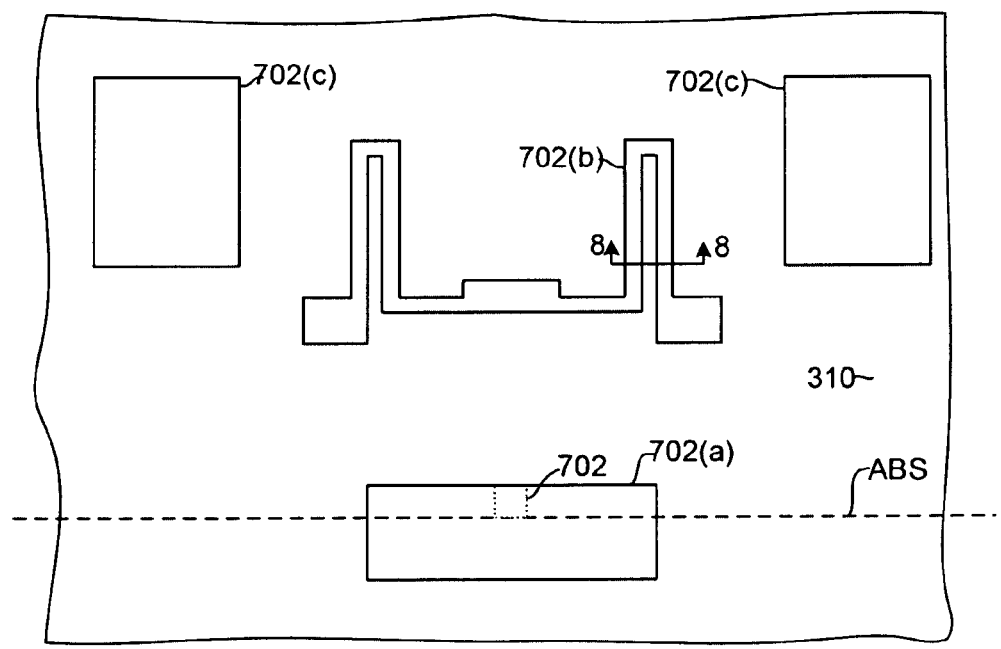

The configuration of the mask 604 can be seen more clearly with reference to FIG. 7, which shows a top down view of the mask 604 and full film deposited sensor layers 310. The area where the final sensor will be formed is shown for reference by dotted lines 702. The location where the air bearing surface will be formed is indicated by dashed line ABS. The mask 604 Includes a sensor defining portion 702(a), an ESD resistor defining portion 702(b), and may include relatively large SIMS detection pads 702(c), the purpose of which will be described further below. In the presently described embodiment, the sensor defining mask portion 702(a) is configured to define a stripe height (ie. the back edge) of the sensor. However, the invention could also be performed with ESD mask portion 702(b) being defined In the same step as a track width defining sensor mask.

Figure 8:
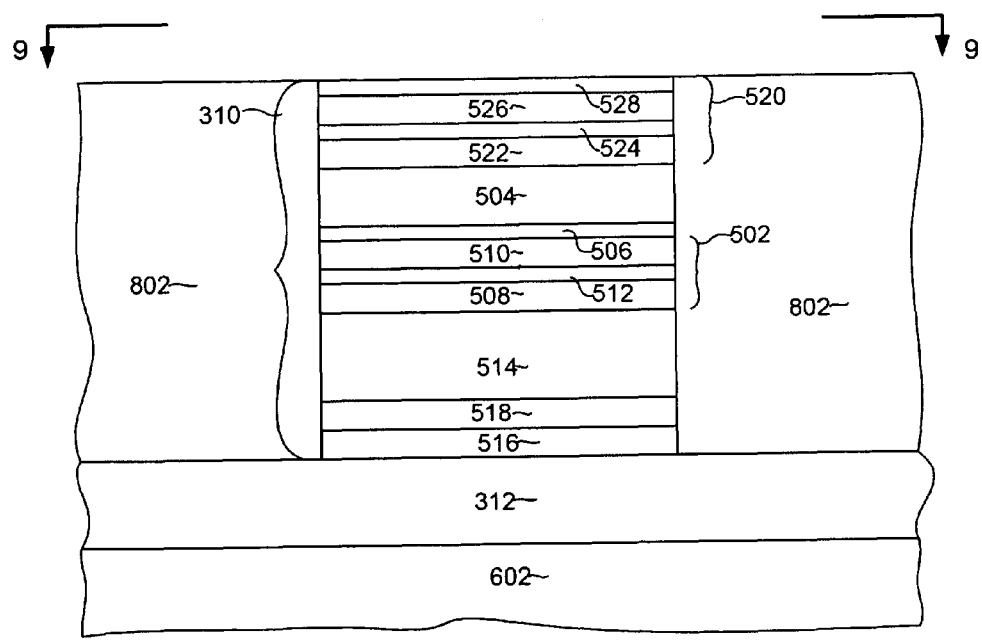

FIG. 8 shows a cross sectional view as taken from line 8-8 of FIG. 7. With the mask in place, an ion milling or other suitable material removal process is performed to remove portions of the sensor material 310 that are not protected by the mask. A non-magnetic, electrically insulating fill material such as alumina 802 can then be deposited, and the mask 702 removed, resulting in a structure as shown in FIG. 8. A chemical mechanical polishing process can be performed to planarize the upper surface of the sensor layers 310 and fill material 802.

Figure 9:
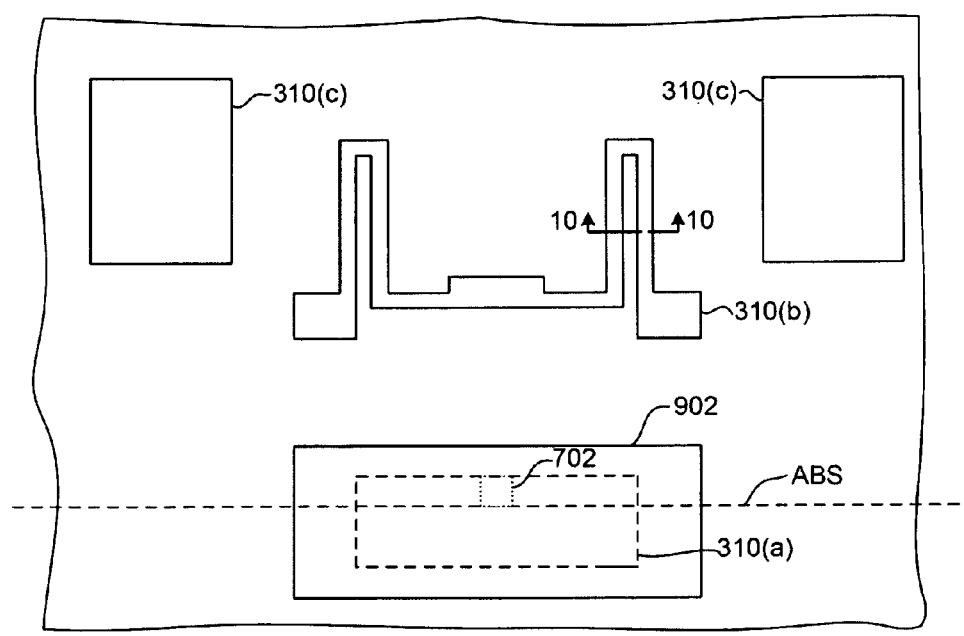

FIG. 9 shows a top down view of the structure of FIG. 8 as taken from line 9-9 of FIG. 8. A second mask structure 902 is formed over the sensor area to protect the sensor material 310 that remains in the sensor area. The sensor material 310(a) in the sensor area is shown in dashed line to illustrate that it is beneath the second mask 902. This second mask structure, which can be constructed of patterned photoresist, is constructed to completely cover the sensor material 310(a) remaining in the sensor area. However, it can be seen that the sensor material 310(b) in the ESD resistor area is not covered. Similarly, the sensor material 310(c) In the SIMS detection pad area or areas is left uncovered.

Figure 10:
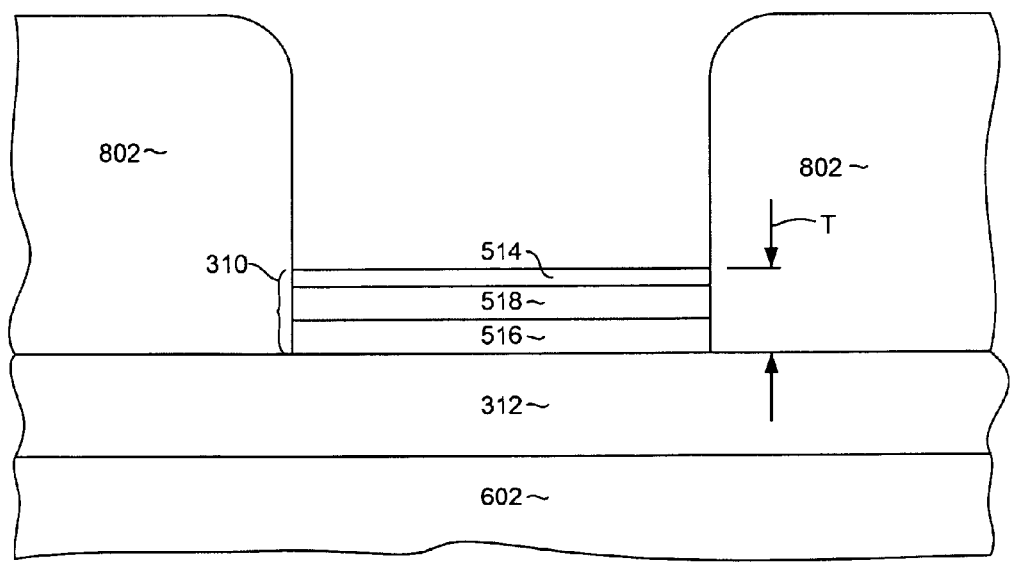

FIG. 10 shows a cross section view taken from line 10-10 of FIG. 9. A material removal process such as reactive ion etching or more preferably reactive ion milling (RIM) is performed to remove portions of the sensor material 310, leaving the seed layers 516, 518, and a portion of the AFM layer 514 intact. Secondary Ion Mass Spectrometry (SIMS) can be used to detect when the material removal process should be terminated. For example, SIMS can be used to detect the presence Ir in the AFM layer 514 during the reactive ion milling, thereby providing an accurate indication of when the reactive ion milling should be terminated. With reference again to FIG. 9, the SIMS pads 310(*c*) provide a large area of sensor material to facilitate detection of a desired materials (such as Ir) during the reactive ion milling (or other similar material removal process). In the presently described embodiment the resistor 310(*b*) was defined in the same patterning step used to define the stripe height (back edge) of the sensor 310(*a*). Another mask patterning and material removal process can then be performed to define the track width of the sensor, forming the sides indicated by dashed lines 702 in FIGS. 7 and 9.

As can be seen with reference to FIG. 10, after the reactive ion milling, only a small portion of the sensor material 310 remains. The remaining material can be just one or both of the seed layers 516, 518, or could include a portion of the AFM layer 514. The remaining portion of the sensor material layer has a high sheet resistivity due to both the small thickness T, as well as the high resistivity of the material making up the seed layers 516, 518. Therefore, with reference to both FIGS. 9 and 10, the remaining sensor material 310(*b*) can be used to construct an ESD shunt resistor having a sufficiently high resistance to be used in a functioning magnetic head without adversely affecting the read or write head performance. Furthermore, this resistor 310(*b*) can be constructed in the same deposition and patterning steps used to define the sensor 310, which greatly reduces manufacturing cost and throughput time as compared with having to create a resistor in separate deposition, masking and material removal processes.

Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic head for use in a data recording system, the magnetic head comprising:
   a slider body;
   a magnetoresistive sensor formed on the slider body, the magnetoresistive sensor comprising a plurality of layers;
   an electrostatic discharge resistor formed on the slider body, the electrostatic discharge being formed of one or more material layers that are formed of the same material as and in a common plane with only a portion of the plurality of layers of the magnetoresistive sensor; and
   first and second magnetic shields, the magnetoresistive sensor being sandwiched between the first and second magnetic shields, and wherein the electrostatic discharge resistor is electrically connected with at least one of the first and second magnetic shields and also with the slider body;
   the magnetoresistive sensor comprising a seed layer structure, wherein the seed layer structure includes a layer of Ta and a layer of Ru.

2. A magnetic head as in claim 1 further comprising a write head formed on the slider body, the electrostatic discharge resistor being electrically connected with the slider body and the write head.

3. A magnetic head as in claim 1 further comprising a write head including a magnetic pole, and wherein the electrostatic discharge resistor is electrically connected with the magnetic pole and with the slider body.

4. A magnetic head for magnetic data recording, comprising:
   a slider body;
   a magnetoresistive sensor formed on the slider body, the magnetoresistive sensor further comprising:
      a seed layer structure;
      a layer of antiferromagnetic material formed over the seed layer structure;
      a non-magnetic layer formed over the layer of antiferromagnetic material; and
      a magnetic free layer formed over the non-magnetic layer; and
   an electrostatic discharge resistor formed of the same material as and in a common plane with the seed layer structure;
   wherein the electrostatic discharge resistor consists of the same material as the seed layer structure and the layer of antiferromagnetic layer and has a thickness not greater than the combined thicknesses of the seed layer structure and the layer of antiferromagnetic layer.

5. A sensor as in claim 4 wherein the seed layer structure includes a layer of Ta.

6. A sensor as in claim 4 wherein the seed layer structure includes a layer of Ru.

7. A sensor as in claim 4 wherein the seed layer structure includes a layer of Ta and a layer or Ru formed over the layer of Ta.

8. A sensor as in claim 4 wherein the electrostatic discharge resistor consists of the same material as the seed layer structure and has a thickness not greater than that of the seed layer structure.

* * * * *